(12) United States Patent
Bolotnikov et al.

(10) Patent No.: US 10,403,711 B2
(45) Date of Patent: Sep. 3, 2019

(54) DESIGNING AND FABRICATING SEMICONDUCTOR DEVICES WITH SPECIFIC TERRESTRIAL COSMIC RAY (TCR) RATINGS

(71) Applicant: General Electric Company, Schenectady, NY (US)

(72) Inventors: Alexander Viktorovich Bolotnikov, Niskayuna, NY (US); Ljubisa Dragoljub Stevanovic, Clifton Park, NY (US); Peter Almern Losee, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/295,779

(22) Filed: Oct. 17, 2016

(65) Prior Publication Data
US 2017/0243935 A1     Aug. 24, 2017

Related U.S. Application Data

(60) Provisional application No. 62/299,401, filed on Feb. 24, 2016.

(51) Int. Cl.
*H01L 29/06* (2006.01)
*H01L 29/861* (2006.01)
(Continued)

(52) U.S. Cl.
CPC .......... *H01L 29/06* (2013.01); *G06F 17/5036* (2013.01); *G06F 17/5068* (2013.01);
(Continued)

(58) Field of Classification Search
CPC . G06F 17/5036; H01L 23/552; H01L 23/556; H01L 29/1608; H01L 29/66363
See application file for complete search history.

(56) References Cited

U.S. PATENT DOCUMENTS 8,564,088 B2   10/2013  Schmidt
8,823,084 B2    9/2014  Gamerith et al.
(Continued)

FOREIGN PATENT DOCUMENTS

DE    43 05 040 A1   8/1994
EP    0 668 617 A2   8/1995
(Continued)

OTHER PUBLICATIONS

Richard Maurer et al., Harsh Environments: Space Radiation Environment, Effects and Mitigation, Johns Hopkins, APL Technical Digest, vol. 28, No. 1 (2008).*

(Continued)

*Primary Examiner* — Sonya D. McCall-Shepard
(74) *Attorney, Agent, or Firm* — Fletcher Yoder, P.C.

(57) ABSTRACT

In one embodiment, a method of manufacturing a silicon-carbide (SiC) device includes receiving a selection of a specific terrestrial cosmic ray (TCR) rating at a specific applied voltage, determining a breakdown voltage for the SiC device based at least on the specific TCR rating at the specific applied voltage, determining drift layer design parameters based at least on the breakdown voltage. The drift layer design parameters include doping concentration and thickness of the drift layer. The method also includes fabricating the SiC device having a drift layer with the determined drift layer design parameters. The SiC device has the specific TCR rating at the specific applied voltage.

11 Claims, 6 Drawing Sheets

(51) Int. Cl.

| | | |
|---|---|---|
| *H01L 29/732* | (2006.01) | |
| *H01L 29/808* | (2006.01) | |
| *H01L 29/78* | (2006.01) | |
| *H01L 29/745* | (2006.01) | |
| *H01L 29/739* | (2006.01) | |
| *H01L 29/66* | (2006.01) | |
| *G06F 17/50* | (2006.01) | |
| *H01L 29/16* | (2006.01) | |
| *H01L 23/556* | (2006.01) | |
| *H01L 23/552* | (2006.01) | |
| *H01L 29/872* | (2006.01) | |
| *H01L 29/868* | (2006.01) | |

(52) U.S. Cl.
CPC .......... *H01L 23/552* (2013.01); *H01L 23/556* (2013.01); *H01L 29/1608* (2013.01); *H01L 29/66068* (2013.01); *H01L 29/732* (2013.01); *H01L 29/7395* (2013.01); *H01L 29/745* (2013.01); *H01L 29/7802* (2013.01); *H01L 29/7813* (2013.01); *H01L 29/8083* (2013.01); *H01L 29/861* (2013.01); *G06F 2217/06* (2013.01); *H01L 29/868* (2013.01); *H01L 29/8611* (2013.01); *H01L 29/872* (2013.01)

(56) References Cited

U.S. PATENT DOCUMENTS

| | | | |
|---|---|---|---|
| 8,921,931 | B2 | 12/2014 | Mauder et al. |
| 9,064,923 | B2 | 6/2015 | Baburske et al. |
| 2008/0128798 | A1 | 6/2008 | Schulze et al. |
| 2010/0237389 | A1* | 9/2010 | Hakey .................. H01L 21/84 257/213 |
| 2013/0240902 | A1 | 9/2013 | Schulze et al. |
| 2013/0336033 | A1 | 12/2013 | Hirler et al. |
| 2014/0001514 | A1 | 1/2014 | Schulze et al. |
| 2016/0190234 | A1* | 6/2016 | Iijima .................. H01L 29/78 257/77 |
| 2018/0026102 | A1* | 1/2018 | Gammon ............ H01L 29/7393 257/77 |

FOREIGN PATENT DOCUMENTS

| | | | |
|---|---|---|---|
| WO | 2010/142342 A1 | | 12/2010 |
| WO | WO2015053805 | * | 4/2015 |

OTHER PUBLICATIONS

Bhatnagar et al., Comparison of 6H-SiC, 3C-SiC and Si for Power Devices, IEEE Transactions on Electron Devices, vol. 40, No. 3, Mar. 1993.*

Consentino et al., "Effects on Power Transistors of Terrestrial Cosmic Rays: Study, Experimental Results and Analysis", IEEE Xplore, pp. 2582-2587 Apr. 24, 2014.*

International Search Report and Written Opinion issued in connection with corresponding PCT Application No. PCT/US2017/018257 dated May 10, 2017.

Ziegler, J.F.; "Terrestrial Cosmic Rays," IBM J. Res. Develop, vol. 40, No. 1, Jan. 1996, 19-39.

Baliga, Jayant B.; "Fundamentals of Power Semiconductor Devices", Electrical Machines and Systems, Electronics & Electrical Engineering, pp. 91-104, 2008.

Antoniou, Marina, et al.; "The 3.3kV Semi-SuperJunction IGBT for increased cosmic ray induced breakdown immunity", Power Semiconductor Devices & IC's, 2009. ISPSD 2009. 21st International Symposium on, pp. 168-171, Jun. 14-18, 2009, Barcelona.

Bolotnikov, A., et al.; "Overview of 1.2kV-2.2kV SiC MOSFETs targeted for industrial power conversion applications", Applied Power Electronics Conference and Exposition (APEC), 2015 IEEE, pp. 2445-2452, Mar. 15-19, 2015, Charlotte, NC.

Davidson, C.D. et al., "Failures of MOSFETs in terrestrial power electronics due to single event burnout", 26th Annual International Telecommunications Energy Conference, pp. 503-507, (Sep. 19, 2004).

Asai, H. et al., "Tolerance Against Terrestrial Neutron-Induced Single-Event Burnout in SiC MOSFETs," IEEE Transactions on Nuclear Science, vol. 61, Issue. 6, pp. 3109-3114, (Dec. 1, 2014) (Abstract).

Rashed, K. et al., "Terrestrial Neutron Induced Failure in Silicon Carbide Power MOSFETs," IEEE Radiation Effects Data Workshop, pp. 1-4, (Jul. 14, 2014) (Abstract).

* cited by examiner

DESIGNING AND FABRICATING SEMICONDUCTOR DEVICES WITH SPECIFIC TERRESTRIAL COSMIC RAY (TCR) RATINGS

CROSS-REFERENCE TO RELATED APPLICATION

This application claims priority to and the benefit of Provisional Application No. 62/299,401, entitled "DESIGNING AND FABRICATING SEMICONDUCTOR DEVICES WITH SPECIFIC TERRESTRIAL COSMIC RAY (TCR) RATINGS", filed Feb. 24, 2016, which is herein incorporated by reference in its entirety.

BACKGROUND

The subject matter disclosed herein relates to semiconductors and, more specifically, to methods for designing and fabricating silicon carbide (SiC) devices with specific terrestrial cosmic ray (TCR) ratings.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Power devices, such as diodes, power MOSFETs, insulated-gate bipolar transistor (IGBTs), and the like are used in a variety of power conversion systems. Such devices in space, high altitude, and terrestrial systems are vulnerable to destructive single event burnout (SEB) induced by energetic particles. Operation of the various power devices may be impacted by terrestrial cosmic rays (TCR). For example, TCR exposure can cause a power device to fail in an undesirable fashion, which may lead to equipment/system malfunction and/or damage. Additionally, certain applications may specify that power devices with a certain TCR failure rate rating are to be used in particular equipment.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the present disclosure. Indeed, the disclosed techniques may encompass a variety of forms that may be similar to or different from the embodiments set forth below.

In one embodiment, a method of manufacturing a silicon-carbide (SiC) device includes receiving a selection of a specific terrestrial cosmic ray (TCR) rating at a specific applied voltage, determining a breakdown voltage for the SiC device based at least on the specific TCR rating at the specific applied voltage, determining drift layer design parameters based at least on the breakdown voltage. The drift layer design parameters include doping concentration and thickness of the drift layer. The method also includes fabricating the SiC device having a drift layer with the determined drift layer design parameters. The SiC device has the specific TCR rating at the specific applied voltage.

In one embodiment, an electronic device includes one or more processors configured to execute computer instructions that cause the one or more processors to receive inputs including a specific TCR rating at a specific applied voltage for a silicon-carbide (SiC) device, determine breakdown voltage for the SiC device based at least on the specific TCR rating at the specific applied voltage, determine drift layer design parameters for the SiC device based at least on the breakdown voltage, and output the drift layer design parameters.

In one embodiment, a silicon-carbide (SiC) device designed for a specific terrestrial cosmic ray (TCR) failure rate at a specific applied voltage includes a drift layer including parameters determined for the specific TCR failure rate rating at the specific applied voltage. The parameters are determined based at least on breakdown voltage of the SiC device, and the TCR failure rate is determined based at least on the specific applied voltage and the breakdown voltage in accordance with the following relationship:

$$TCR \text{ failure rate } \left(\frac{FIT}{cm^2}\right) = 10^{\wedge}\left(A + B * \frac{V}{BV}\right)$$

where A is a constant value, B is a constant value, V is the specific applied voltage, and BV is the breakdown voltage.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As mentioned, certain applications may specify that semiconductor power devices with a certain TCR rating are to be used. It is presently recognized that particular characteristics of semiconductor power devices may define their susceptibility to the TCR effects. While it is understood that the doping concentration and thickness of the drift layer of a semiconductor power device may define the rated performance (e.g., blocking capability) of the device, it is presently recognized that the drift layer design may also define the susceptibility of the semiconductor devices to terrestrial cosmic ray (TCR) radiation effects, such as causing the semiconductor device to fail catastrophically. Accordingly, embodiments of the present disclosure generally relate to methods for designing and fabricating semiconductor devices with specific TCR failure rates based on the design parameters of the drift layer. Furthermore, while the present approach may be discussed below in the context of SiC MOSFET devices, it should be appreciated that the present approach may be applicable to other types of device structures (e.g., diode (e.g., Schottky, PIN, JBS, MPS, etc.), thyristor, MOSFET, UMOSFET, VMOSFETs, DMOSFETs, insulated gate bipolar transistors (IGBT), bipolar transistor (BJT), insulated base MOS-controlled thyristors (IBMCT), junction field effect transistors (JFET), and metal-semiconductor field effect transistor (MESFET), or any other suitable device) utilizing both n- and p-channel designs.

Figure 1:
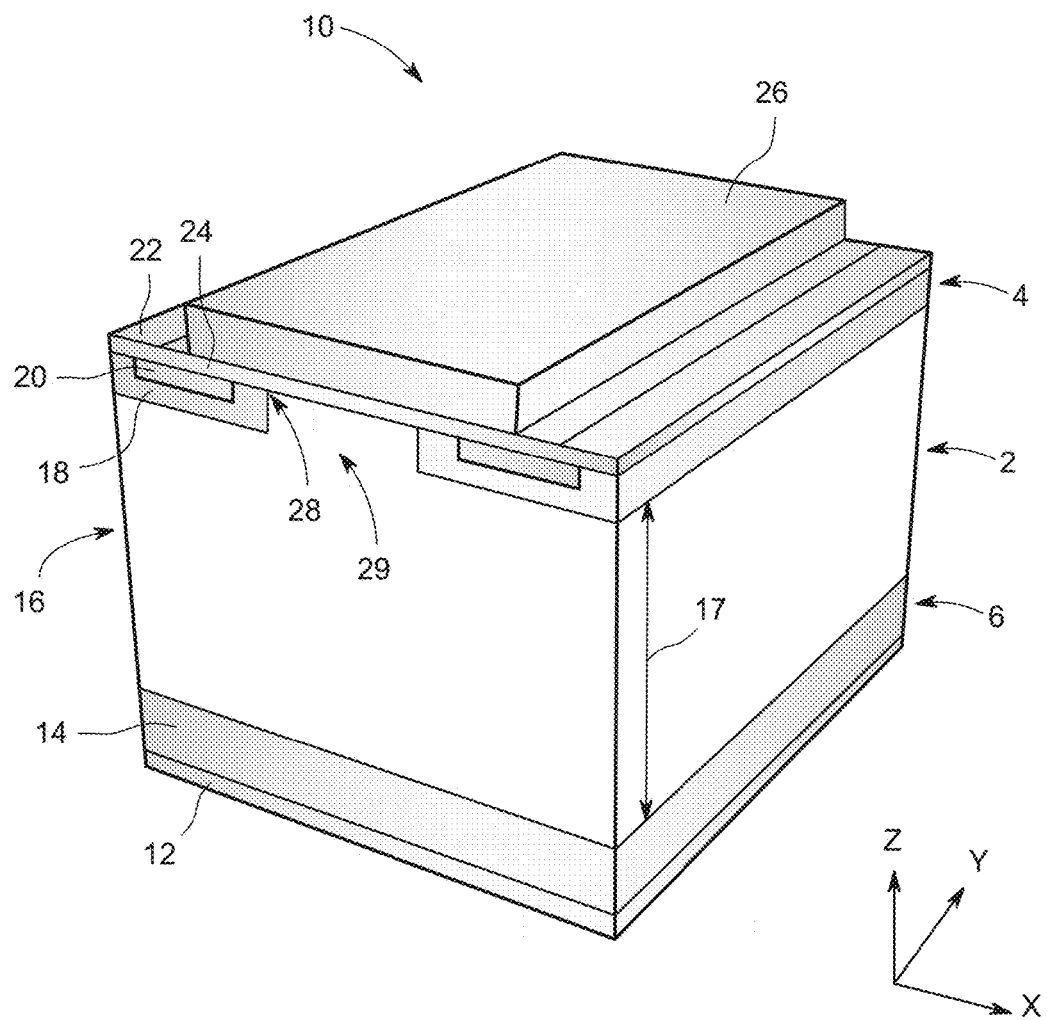
FIG. 1 is a schematic of a planar SiC MOSFET device, in accordance with embodiments of the present technique.

FIG. 1 illustrates an active cell of a planar n-channel field-effect transistor, namely a DMOSFET, hereinafter MOSFET device 10, designed to have a particular TCR rating, in accordance with embodiments of the present technique. It may be appreciated that, in order to more clearly illustrate certain components of the MOSFET device 10, as well as other devices discussed below, certain commonly understood design elements (e.g., top metallization, passivation, edge termination, and so forth) may be omitted. The illustrated MOSFET device 10 of FIG. 1 includes a semiconductor layer 2 (e.g., a silicon carbide (SiC) semiconductor layer) having a first surface 4 and a second surface 6. The semiconductor layer 2 includes a drift region 16 having a first conductivity type (e.g., an n-type drift layer 16), a well region 18 adjacent to the drift region and proximal to the first surface, the well region 18 having a second conductivity type (e.g., a p-well 18). As discussed in greater detail below, the drift layer 16 has a particular thickness 17, as well as a particular dopant concentration, to provide a certain breakdown voltage and TCR failure rate rating, in accordance with the present technique. Cosmic rays at sea level consist of a spectrum of particles including protons, neutrons, pions, muons, electrons, and photons based on a relationship of flux and particle energy.

For the MOSFET device 10 illustrated in FIG. 1, the semiconductor layer 2 also includes a source region 20 that is adjacent to the well region 18, the source region having the first conductivity type (e.g., n-type source region 20). A gate insulating layer 24 is disposed on a portion of the first surface 4 of the semiconductor layer 2, and a gate electrode 26 is disposed on the gate insulating layer 24. The second surface 6 of the semiconductor layer 2 is a substrate layer 14, and the drain contact 12 is disposed on the bottom of device 10 along the substrate layer 14. Source/body contact 22 is disposed on top of the semiconductor layer 2, partially covering source region 20 and well/body regions 18. During operation, an appropriate gate voltage (e.g., at or beyond a threshold voltage ($V_{TH}$) of the MOSFET device 10) may cause an inversion layer to be formed in the channel region 28, as well as a conductive path to be enhanced in the junction field-effect transistor (JFET) region 29 due to accumulation of carriers, allowing current to flow between the contact 22 (i.e., the source electrode) and the drain contact 12. It should be appreciated that, for the MOSFET devices discussed herein, the channel region 28 may be generally defined as an upper portion of the well region 18 disposed below the gate electrode 26 and gate dielectric 24.

As discussed above, embodiments of the MOSFET devices 10 that have different design parameters for the drift layer 16 have different breakdown voltage ratings. In general, the breakdown voltage increases as the thickness 17 of the drift layer 16 increases and doping concentration decreases, and decreases as the thickness 17 of the drift layer 16 decreases and doping concentration of the drift layer 16 increases. For different types of device designs (e.g., non-punch-through designs, punch-through designs), breakdown voltage can be estimated analytically using one or more physical/mathematical relationships based on the design parameters of the drift layer 16.

Figure 2:
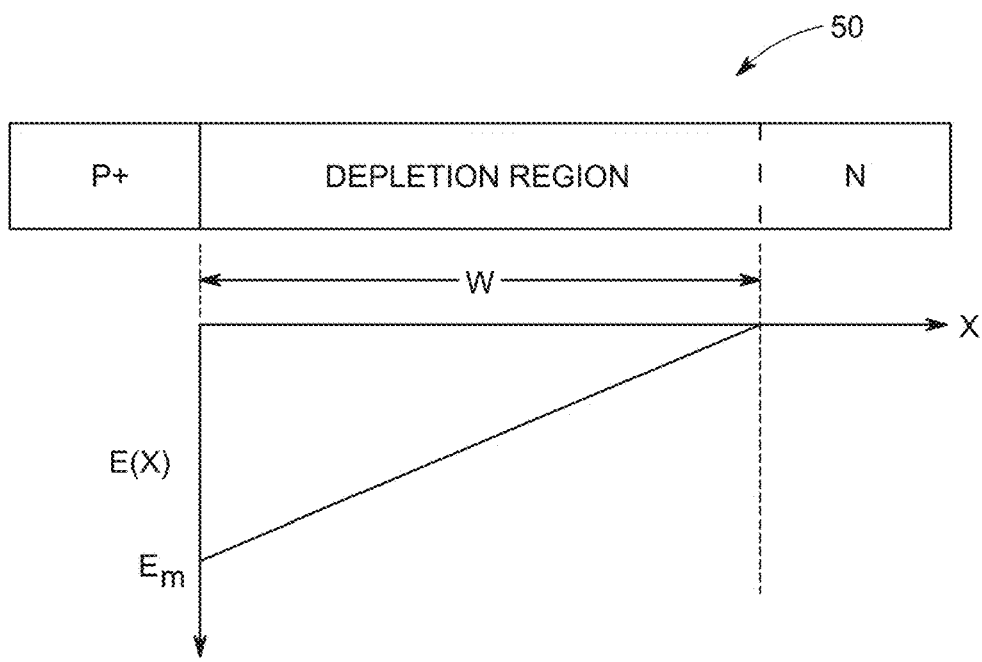
FIG. 2 is a schematic illustrating a model of an electric field used for calculating breakdown voltage of a non-punch-through SiC device design, in accordance with embodiments of the present technique.

For example, FIG. 2 is a schematic illustrating a representation of an electric field model 50 that can be used for calculating breakdown voltage of a parallel-plane (e.g., a non-punch-through) 4H-SiC MOSFET device design. Although a 4H polytype is discussed regarding the SiC device herein, it should be noted that any suitable polytype (e.g., 2H, 6H, 3C, etc.) may be used in certain embodiments. In the model 50, a P$^+$/N junction is shown, where the P$^+$ side is highly doped (e.g., greater than $1\times10^{19}$ cm$^{-3}$). The depletion region is formed when the junction is reversed-biased by the application of a positive bias to the N-region. A strong electric field is also generated in the N-region to support the voltage. As depicted, the electric field has a maximum magnitude ($E_m$) at x=0 and decreases to zero at x=W at a linear rate, thus forming a triangular electric field distribution. It should be noted that x=0 is at the intercept of the two axes (x and E(x)). The model 50 may be used to derive an analytical estimation for the breakdown voltage of the non-punch-through 4H SiC MOSFET device design in accordance with the following relationship:

$$BV(\text{4H-SiC}) = 3.0 \times 10^{15} N_D^{-3/4} \quad \text{(Equation 1)}$$

where BV is the non-punch-through parallel-plane breakdown voltage and $N_D$ is the doping concentration in the drift layer 16. In addition, the model 50 may be used to derive an analytical estimation for the drift layer 16 thickness for the non-punch-through 4H-SiC MOSFET device design in accordance with the following relationship:

$$W(\text{4H-SiC}) = 1.82 \times 10^{11} N_D^{-7/8} \quad \text{(Equation 2)}$$

where W is the non-punch-through design drift layer thickness and $N_D$ is the drift layer 16 doping concentration.

Figure 3:
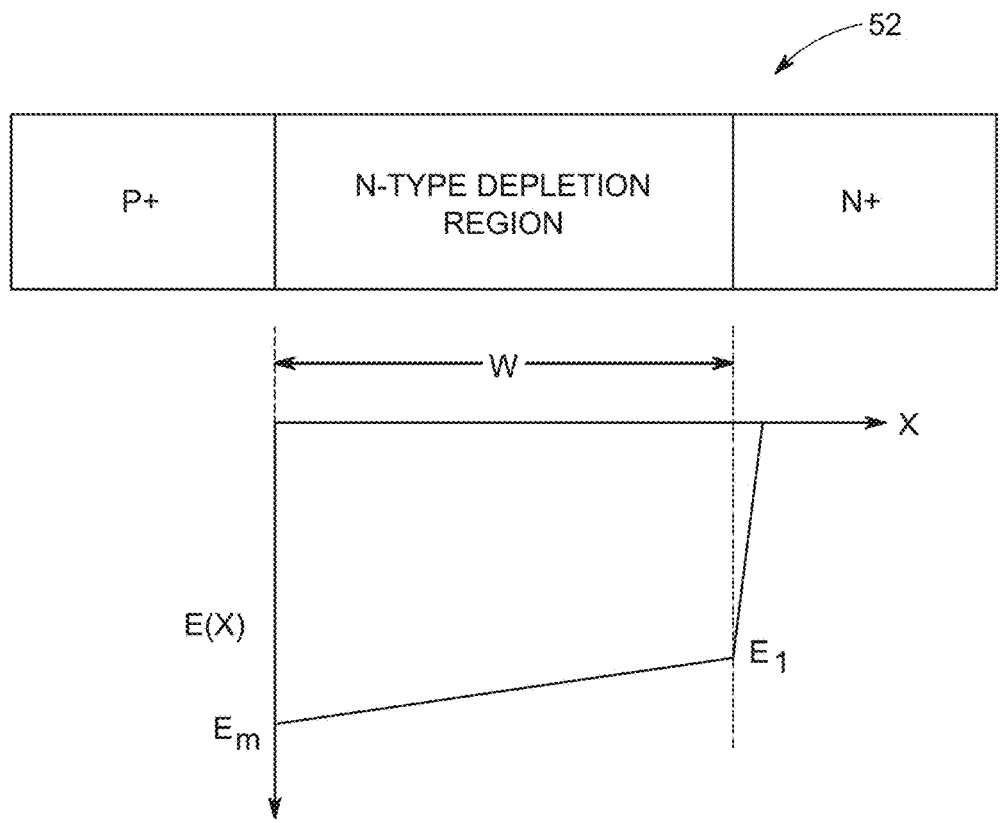
FIG. 3 is a schematic illustrating a model of an electric field used for calculating breakdown voltage of a punch-through SiC device design, in accordance with embodiments of the present technique.

Breakdown voltages may also be analytically estimated based on the parameters of the drift layer 16 for other SiC MOSFET device designs, such as punch-through designs. For example, FIG. 3 is a schematic illustrating an electric field model 52 that can be used to calculate breakdown voltage of a punch-through plane 4H-SiC MOSFET device design. For punch-through plane designs, a thinner depletion region is used with a reduced doping concentration to support the applied voltage. In such designs, the reduced drift thickness is beneficial for reducing on-resistance of unipolar devices as well as on-state voltage drop and stored charge of bipolar devices. Further, the N region is highly doped. As shown in the model 52, the electric field gradually decreases through the depletion region, due to the low doping concentration, and decreases abruptly in the N+ region, due to the high doping concentration. The model 52 may be used to derive an analytical estimation for the breakdown voltage of the punch-through plane design in accordance with the following relationship:

$$BV(4H-SiC) = E_C - \frac{qN_D W^2}{2\varepsilon_S} \quad \text{(Equation 3)}$$

Where BV is the punch-through parallel-plane breakdown voltage, Ec is the critical electric field, W is the thickness 17 of the drift layer 16, $N_D$ is the doping concentration in the drift layer 16, q is the electron charge (1.602e-19C), and $\varepsilon_s$ is the semiconductor material permittivity. In addition, the model 52 may be used along with known material impact ionization constants to derive an analytical estimation for the critical electric field for the punch-through plane design in accordance with the following relationship:

$$E_c(4H\text{-SiC}) = 3.3 \times 10^4 N_D^{1/8} \quad \text{(Equation 4)}$$

As should be appreciated, the above relationships may be used to determine the doping concentration and thickness 17 for the drift layer 16 based on a desired breakdown voltage. Additionally, if a desired breakdown voltage is known, the above relationships for non-punch-through and punch-through plane designs may be used to calculate a doping concentration and thickness 17 for the drift layer 16 to provide a semiconductor device 10 having the desired breakdown voltage. As set forth below, present embodiments further provide a method for determining an estimated TCR failure rate rating for the semiconductor device 10, based on this breakdown voltage.

Figure 4:
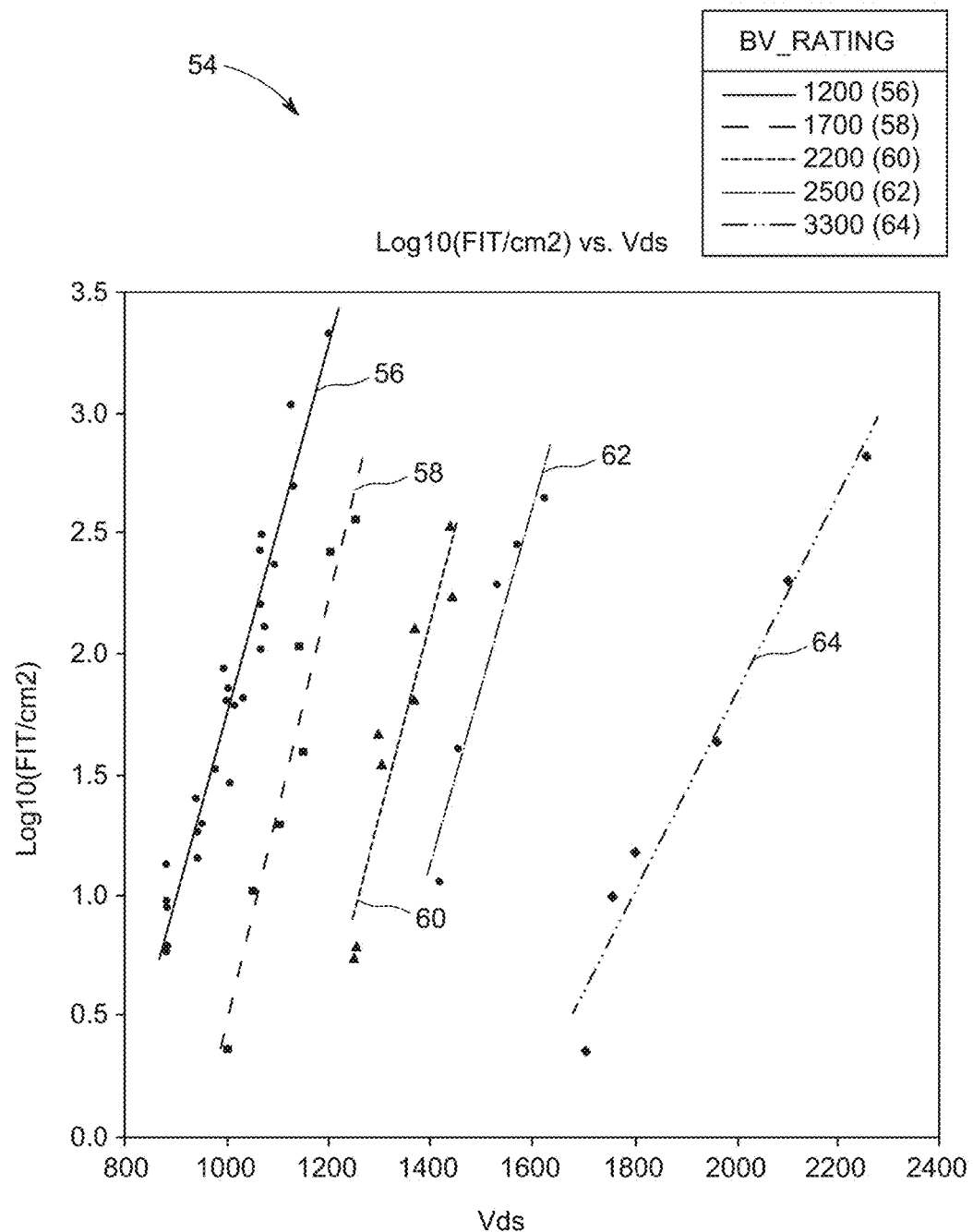
FIG. 4 is a graph illustrating TCR failure rate versus applied voltage for SiC devices having different maximum voltage ratings, in accordance with embodiments of the present technique.

As previously noted, the design of the drift layer 16 defines the susceptibility of semiconductor devices to TCR radiation effects. FIG. 4 is a graph 54 illustrating an example of normalized failure rate (1 failure-in-time (FIT)=1 failure per 1×10⁹ device-hours) due to TCR exposure versus applied voltage for SiC devices (e.g., MOSFET 10, diodes) having different maximum voltage (BVR) rating. More specifically, curve 56 represents a SiC device with a $BV_R$ of 1.2 kV, curve 58 represents a SiC device with a BV of 1.7 kV, curve 60 represents a SiC device with a BVR of 2.2 kV, curve 62 represents a SiC device with a BV of 2.5 kV, and curve 64 represents a SiC device with a BVR of 3.3 kV, each curve fit to a respective set of experimental measurement points. From FIG. 5 it is clear that the FIT rate is dependent on applied voltage for a particular BVR. Further, it may be appreciated that the SiC device voltage rating is not identical to the breakdown voltage (BV). That is, in general, the applied voltage is less than the breakdown voltage. Accordingly, in some embodiments, a SiC device may be designed and developed for a specific TCR failure rate at certain voltage by optimizing the drift layer 16 design (e.g., adding/removing breakdown voltage margins).

Figure 5:
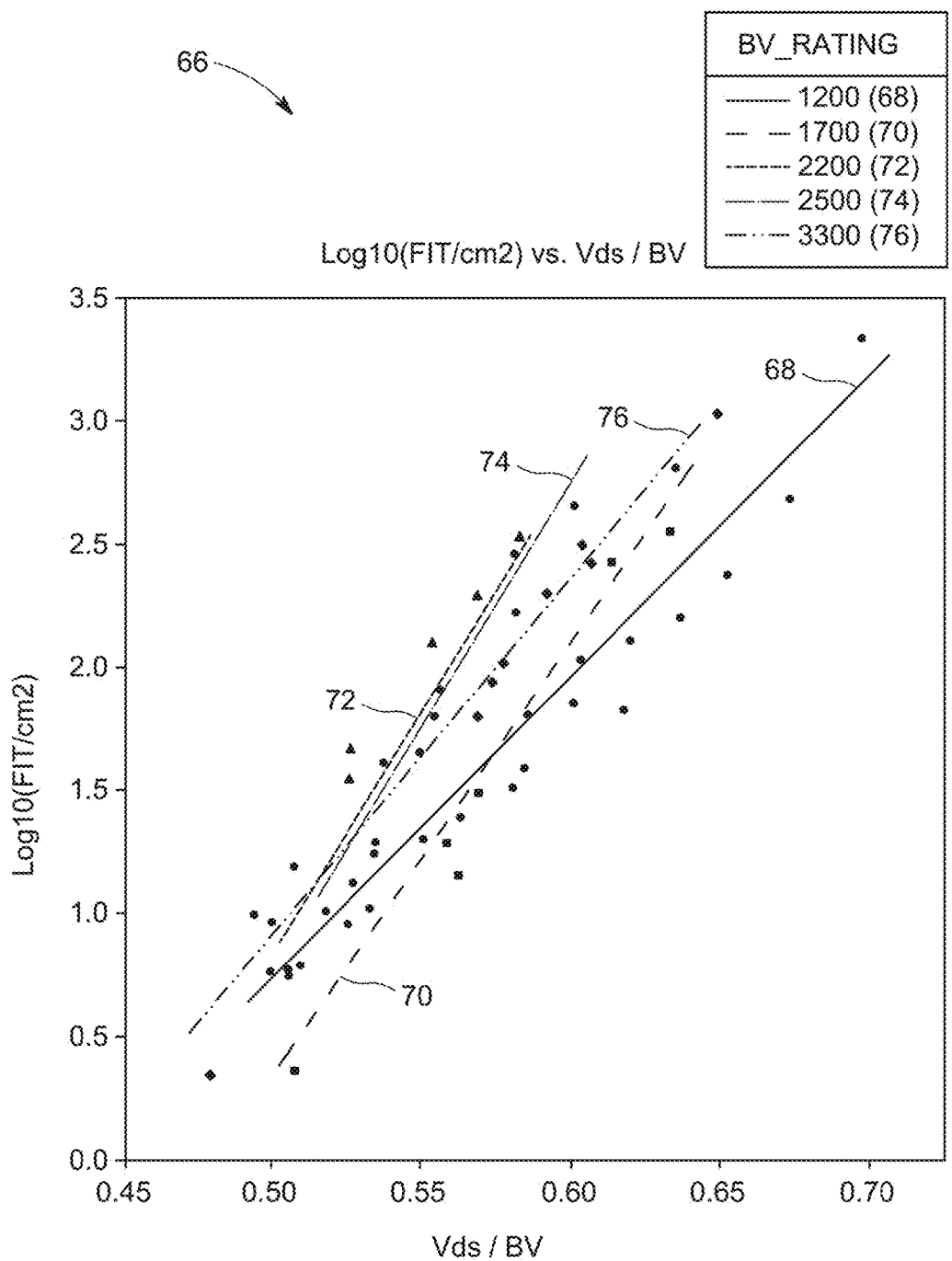
FIG. 5 is a graph illustrating TCR failure rates versus normalized voltage for SiC devices having different maximum voltage ratings, in accordance with embodiments of the present technique.

To further illustrate, FIG. 5 is a graph 66 depicting generalized TCR failure rate versus applied voltage (normalized to device breakdown voltage). The curves 68, 70, 72, 74, and 76, each representing a SiC device with different maximum voltage ratings (i.e., 1.2 kV, 1.7 kV, 2.2 kV, 2.5 kV, and 3.3 kV), demonstrate substantially similar trends when the applied voltage is normalized to the breakdown voltages of the devices. Accordingly, in some embodiments, the following relationship may be used to design a SiC device with a specific TCR rating:

$$TCR \text{ failure rate } \left(\frac{FIT}{cm^2}\right) = 10^{\wedge}\left(A + B * \frac{V}{BV}\right) \quad \text{(Equation 5)}$$

where A is a constant value that ranges from −4 to −10 (e.g., from −5 to −6), B is a constant value that ranges from 10 to 20 (e.g., from 11 to 14), V is the applied voltage, and BV is the breakdown voltage. In some embodiments, BV may be obtained from the analytical estimations (e.g., equation 1 or equation 3) described above, from experimental results, or from some combination thereof. For example, in certain embodiments, equation 5 may be combined with equation 1 or equation 3 such that TCR failure rates may be estimated directly from the thickness 17 and the doping concentration of the drift layer 16. To illustrate, combining equations 5 and 1 for non-punch-through results in the following relationship:

$$TCR \text{ failure rate } \left(\frac{FIT}{cm^2}\right) = 10^{\wedge}\left(A + B * \frac{V}{3e15 * N_D}\right) \quad \text{(Equation 6)}$$

Further, combining equations 5 and 3 for punch-through results in the following relationship:

$$TCR \text{ failure rate } \left(\frac{FIT}{cm^2}\right) = \quad \text{(Equation 7)}$$
$$10^{\wedge}\left(A + B * V / \left(3.3e4 N_D^{1/8} * W_P - \frac{qN_D W_P^2}{2\varepsilon_s}\right)\right)$$

Figure 6:
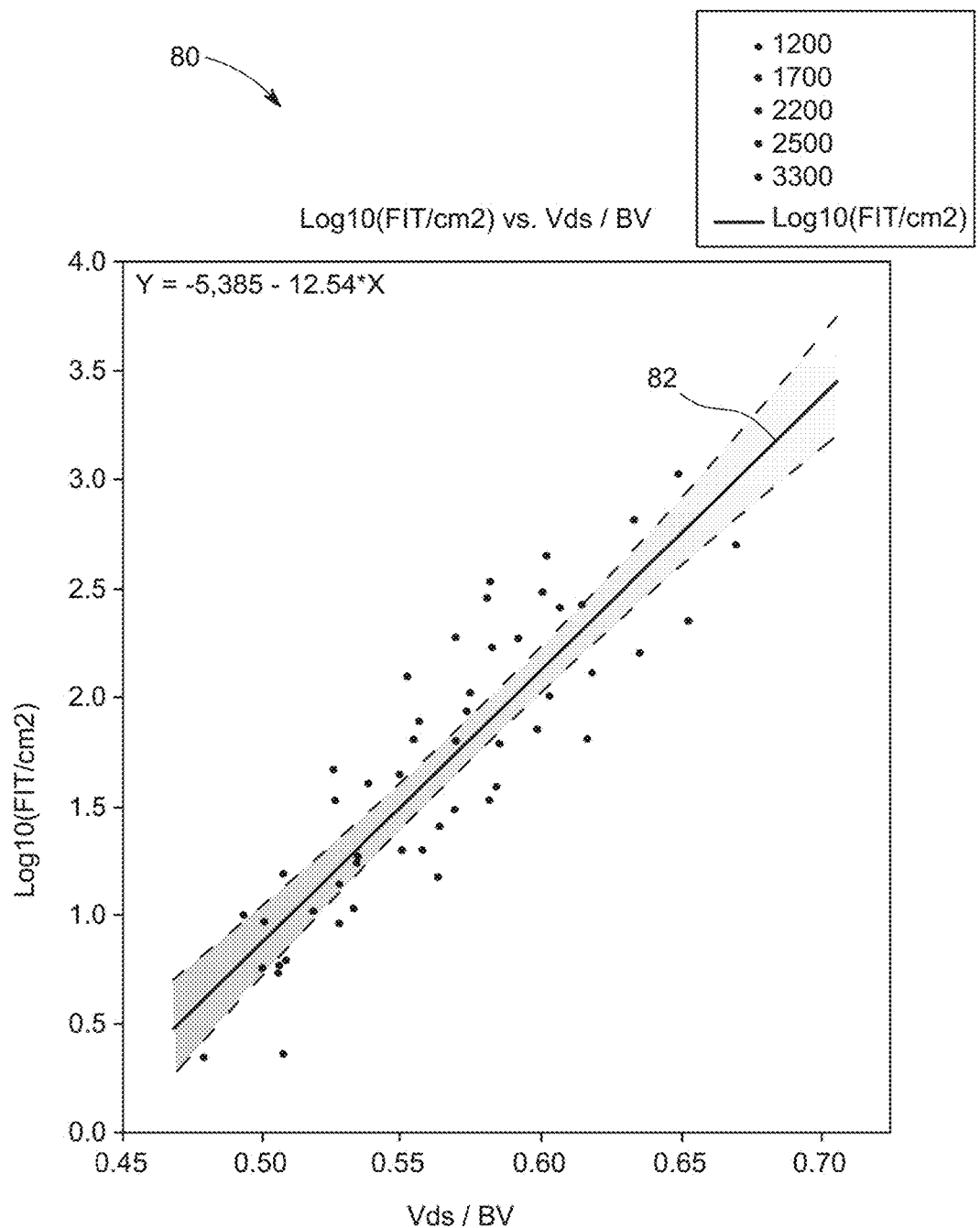
FIG. 6 is a graph illustrating TCR failure rates versus normalized voltage for SiC devices having different maximum voltage ratings, as well as a fit line of TCR failure rates versus normalized voltage across the different maximum voltage ratings, in accordance with embodiments of the present technique.

For example, using the relationship expressed in equation 5, a TCR failure rate (curve 82) may be generalized across all of the SiC devices with different voltage ratings (e.g., 1200V, 1700V, 2200V, 2500V, and 3300V), as illustrated in graph 80 in FIG. 6. The curve 82 of the graph 80 illustrates the presently identified dependence of the TCR failure rate on applied voltage (normalized to BV) across a number of differently rated SiC devices. The trend of curve 82 generally shows that the TCR failure rate for the various rated SiC devices increases as the normalized (to breakdown voltage) applied voltage increase. In some embodiments, the relationship expressed in equation 5 and/or the curve 82 may be used to design a SiC device for a specific TCR failure rate at a certain voltage by extracting the drift layer 16 design parameters that provide breakdown voltage associated with a TCR rating.

Figure 7:
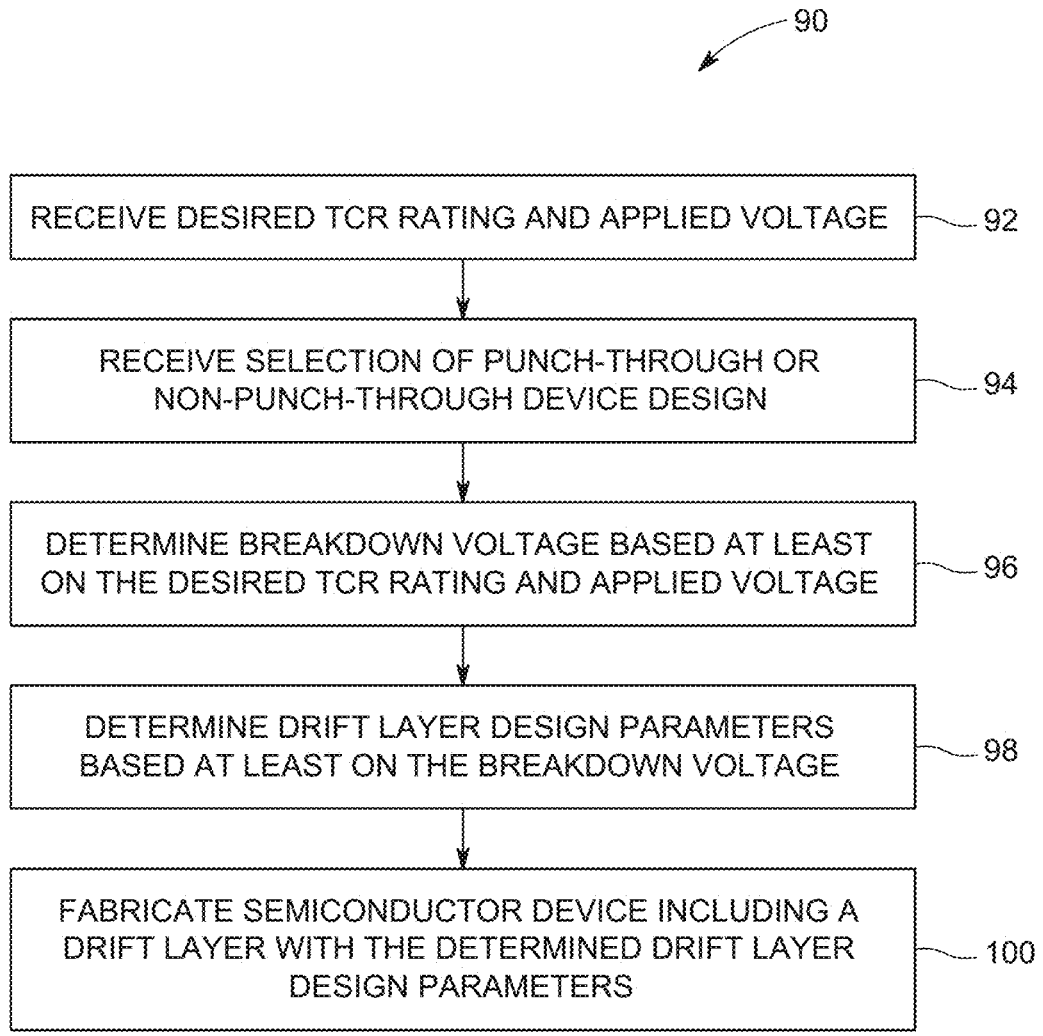
FIG. 7 is a flow diagram of a method of designing and fabricating SiC devices with a specific TCR rating (at a specific applied voltage), in accordance with embodiments of the present technique.

To that end, FIG. 7 is a flow diagram of a process 90 for designing and fabricating SiC devices with specific TCR ratings (at a specific applied voltage). The process 90 may be partially or wholly implemented as computer instructions stored on one or more tangible, non-transitory computer-readable mediums (e.g., memories) and executed by one or more processors. For example, in some embodiments, the process 90 may be wholly performed by a computerized system or a fabrication system, while in some embodiments, a portion of the process 90 may be performed by a computerized system or a fabrication system and a portion of the process 90 may be performed manually. In some embodiments, some of the steps may be performed in a different order than illustrated in the process 90 and/or not all of the steps may be performed.

Referring now to FIG. 7, the illustrated process 90 begins with receiving (block 92) a user input for a desired TCR rating and a specific applied voltage for the TCR rating. For example, the selections may be received from a user interface of the computerized system or fabrication system and received as input by the one or more processors. It should be noted that the TCR rating depends from the applied voltage. That is, the desired TCR rating is a selected as a function of applied voltage. In some embodiments, selections may be received by the one or more processors from another communicatively coupled computing device. In some embodiments, the desired TCR rating and the specific applied voltage may be automatically selected by the one or more processors based on previous input or a preconfigured instruction to generate SiC devices at specific TCR ratings at a specific applied voltage. The process 90 also includes receiving (block 94) a selection to design the SiC device according to a punch-through or non-punch-through plane SiC device design. As discussed below, the selection of the punch-through or non-punch-through plane SiC device design affects which relationships are used to determine the desired drift layer 16 parameters (e.g., doping concentration and thickness) to implement in the SiC device with the desired breakdown voltage and TCR rating. In some embodiments, the process 90 may include receiving a selection of a type of device (e.g., MOSFET).

The illustrated process 90 also includes determining (block 96) the breakdown voltage for the SiC device based at least on the specific TCR rating and the specific applied voltage. In some embodiments, the relationship expressed in equation 5 may be used to determine the breakdown voltage for the selected TCR rating at the applied voltage. That is, the selected TCR rating and the applied voltage may be input into the relationship expressed in equation 5 to obtain the breakdown voltage. The method may also include determining (block 98) drift layer 16 design parameters (e.g., doping concentration and thickness) based at least on the breakdown voltage for the selected TCR rating and applied voltage. The relationships expressed in equations 1-4 may be used to obtain the drift layer 16 design parameters (e.g., thickness 17 of the drift layer 16, doping concentration of the drift layer 16). However, equations 1 and 2 relate to non-punch-through plane device designs and equations 3 and 4 relate to punch-through plane device designs. Further, equation 6 may be used as a single relationship for non-punch-through device designs and equation 7 may be used as a single relationship for punch-through device designs to estimate TCR failure rates from the drift layer 16 design parameters (e.g., thickness 17 and the doping concentration of the drift layer 16), or to determine drift layer 16 design parameters based on a desired TCR failure rate. Thus, the usage of the relationships may be determined based on the selection of whether the SiC device is to be fabricated according to the punch-through or non-punch-through SiC device design.

If the SiC device is designed according to the non-punch-through device design, then equations 1 and 2 may be used to output the drift layer 16 doping concentration and thickness based at least on the breakdown voltage. For example, the breakdown voltage may be input into the relationship expressed in equation 1 and solved to output the drift layer 16 doping. Then, the drift layer 16 doping may be input into the relationship expressed in equation 2 and solved to output the drift layer 16 thickness. Further, if the SiC device is designed according to the punch-through plane device design, then equations 3 and 4 may be used to output the drift layer doping concentration and thickness based at least on the breakdown voltage.

In certain embodiments, such as when the process 90 is performed by a processor of an automated manufacturing system, the process 90 may include fabricating (block 100) a semiconductor device that includes a drift layer having the determined design parameters. In other embodiments, the processor may output the drift layer design parameters determined in block 98 such that the user may perform the fabrication of the semiconductor device manually.

Technical effects of the invention include designing and fabricating a SiC device with a specific TCR rating at a specific applied voltage. Because the drift layer defines the susceptibility of the semiconductor devices to TCR radiation effects, embodiments of the present disclosure enable the determination of drift layer design parameters (e.g., doping concentration and thickness) for the SiC devices with consideration toward both breakdown voltage and TCR rating. Once the drift layer design parameters are determined, the SiC device including a drift layer with such parameters may be fabricated.

This written description uses examples to disclose the techniques, including the best mode, and also to enable any person skilled in the art to practice the techniques, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An electronic device, comprising:
one or more processors configured to execute computer instructions that cause the one or more processors to:
receive inputs comprising a specific terrestrial cosmic ray (TCR) rating at a specific applied voltage for a silicon-carbide (SiC) device;
determine breakdown voltage for the SiC device based at least on the specific TCR rating at the specific applied voltage;
determine drift layer design parameters for the SiC device based at least on the breakdown voltage; and
output the drift layer design parameters, wherein the one or more processors are configured to execute the computer instructions that cause the one or more processors to determine the breakdown voltage by inputting the specific TCR rating and the specific applied voltage into the following relationship:

$$\text{TCR failure rate } \left(\frac{FIT}{\text{cm}^2}\right) = 10^{\wedge}\left(A + B * \frac{V}{BV}\right)$$

where A is a constant value that ranges from −4 to −10, B is a constant value that ranges from 10 to 20, V is the specific applied voltage, BV is the breakdown voltage, and FIT is a normalized failure rate due to TCR exposure.

2. The electronic device of claim 1, wherein the constant value of A ranges from −5 to −6 and the constant value of B ranges from 11 to 14.

3. The electronic device of claim 1, wherein the drift layer design parameters comprise a doping concentration and thickness of the drift layer.

4. The electronic device of claim 1, wherein the one or more processors are configured to execute computer instructions that cause the one or more processors to determine the drift layer design parameters based further on whether a non-punch-through device design or a punch-through device design is selected for the SiC device.

5. The electronic device of claim 1, wherein the SiC device comprises a diode, thyristor, MOSFET, UMOSFET, VMOSFET, DMOSFET, insulated gate bipolar transistors (IGBT), bipolar transistor (BJT), insulated base MOS-controlled thyristors (IBMCT), junction field effect transistor (JFET), or metal-semiconductor field effect transistor (MESFET).

6. A silicon-carbide (SiC) device designed for a specific terrestrial cosmic ray (TCR) failure rate at a specific applied voltage, comprising:
a drift layer including parameters determined for the specific TCR failure rate rating at the specific applied voltage;
wherein the parameters are determined based at least on breakdown voltage of the SiC device, and wherein the TCR failure rate is determined based at least on the specific applied voltage and the breakdown voltage in accordance with the following relationship:

$$\text{TCR failure rate } \left(\frac{FIT}{\text{cm}^2}\right) = 10^{\wedge}\left(A + B * \frac{V}{BV}\right)$$

where A is a constant value that ranges from −4 to −10, B is a constant value that ranges from 10 to 20, V is the specific applied voltage, and BV is the breakdown voltage.

7. The SiC device of claim 6, wherein the parameters comprise doping concentration and thickness of the drift layer.

8. The SiC device of claim 6, wherein the breakdown voltage is further determined based on whether the SiC device includes a non-punch-through design or a punch-through design.

9. The SiC device of claim 6, wherein the SiC device comprises a diode, thyristor, MOSFET, UMOSFET, VMOSFET, DMOSFET, insulated gate bipolar transistors (IGBT), bipolar transistor (BJT), insulated base MOS-controlled thyristors (IBMCT), junction field effect transistor (JFET), or metal-semiconductor field effect transistor (MESFET).

10. The electronic device of claim 1, wherein the one or more processors are configured to execute computer instructions that cause the one or more processors to fabricate the SiC device including a drift layer with the determined drift layer design parameters.

11. The SiC device of claim 6, wherein the constant value of A ranges from −5 to −6 and the constant value of B ranges from 11 to 14.

* * * * *